United States Patent [19]
Tanimoto et al.

[11] Patent Number: 6,009,537
[45] Date of Patent: Dec. 28, 1999

[54] DISK WEAR PREVENTION BY RELOCATING DATA IN RESPONSE TO A HEAD SLIDE COUNT

[75] Inventors: Kazushi Tanimoto, Tokyo; Yuji Sakai; Yutaka Okamoto, both of Kanagawa-ken, all of Japan

[73] Assignee: Kabushiki Kaisha Toshiba, Kawasaki, Japan

[21] Appl. No.: 08/818,980

[22] Filed: Mar. 14, 1997

[30] Foreign Application Priority Data

Mar. 29, 1996 [JP] Japan ................................ 8-075623

[51] Int. Cl.⁶ ........................................................ G06F 12/02
[52] U.S. Cl. .............................. 714/8; 714/770; 369/32; 360/77.05; 711/165
[58] Field of Search ......................... 360/104, 105, 360/106, 107, 81, 86, 75; 395/182.06, 183.18; 711/111, 112, 165, 170, 103; 369/32, 13, 47, 275.1, 59; 714/8, 5, 47, 770

[56] References Cited

U.S. PATENT DOCUMENTS

| | | | |
|---|---|---|---|
| 4,700,244 | 10/1987 | Fasen et al. | 360/77.05 |
| 4,809,248 | 2/1989 | Sengoku | 369/47 |
| 4,887,253 | 12/1989 | Tateishi | 369/32 |
| 4,987,502 | 1/1991 | Freeze | 360/75 |
| 5,198,934 | 3/1993 | Kubo et al. | 360/104 |
| 5,200,959 | 4/1993 | Gross et al. | |
| 5,297,148 | 3/1994 | Harari et al. | |
| 5,422,867 | 6/1995 | Hamaguchi et al. | 369/32 |
| 5,479,638 | 12/1995 | Assar et al. | 711/103 |
| 5,485,595 | 1/1996 | Assar et al. | 711/103 |
| 5,545,989 | 8/1996 | Tian et al. | 324/212 |
| 5,689,384 | 11/1997 | Albrecht et al. | 360/77.12 |
| 5,734,519 | 3/1998 | Fontana, Jr. et al. | 360/97.01 |
| 5,768,054 | 6/1998 | Brezoczky et al. | 360/103 |
| 5,859,738 | 1/1999 | Forehand et al. | 360/75 |

FOREIGN PATENT DOCUMENTS 7-307069  11/1995  Japan.

OTHER PUBLICATIONS

H. Hamilton et al., IEEE, Trans, On Magn., vol. 27, No. 6, pp. 4921–4926 (1991).

Primary Examiner—B. James Peikari
Attorney, Agent, or Firm—Finnegan, Henderson, Farabow, Garrett & Dunner, L.L.P.

[57] ABSTRACT

In the read-write apparatus of the present invention, concentrated sliding of the read-write head in a specific area on the recording media is reduced. The recording media is rotationally set and the read-write head contacts the recording media to read and write information on the recording media. While the read-write head is accessing (read/write) the information on the recording media, a slide count calculation section calculates a slide count of the read-write head by monitoring the servo information of the recording media. The memory section stores the slide count calculated by the slide count calculation section by unit of access area. The relocation section suitably relocates the information recorded on the recording media in accordance with the slide count by unit of the access area.

17 Claims, 7 Drawing Sheets

DISK WEAR PREVENTION BY RELOCATING DATA IN RESPONSE TO A HEAD SLIDE COUNT

BACKGROUND OF THE INVENTION

1. Field of the Invention

The present invention relates to read-write apparatus and methods for reading and writing information on a recording media using a read-write head which contacts the recording media.

2. Description of the Related Art

As an example of the read-write apparatus of a prior art, a magnetic disk apparatus is explained. In the magnetic disk apparatus of the prior art, the read-write head ("head" hereafter) consisting of a head slider of magnetic head flies above the surface of the recording media ( "disk" hereafter) using pressure generated by air while the disk rotates at high speed. The information is read and written under a condition that spacing between the head and the disk is almost fixed. In short, the head does not contact the disk while the diak is rotating. The head does not slide on the disk.

However, when recording wave length becomes short to improve recording-density, if the spacing between the head and the disk is kept constant, output from the magnetic head decreases. Therefore, it is necessary that flying height of the head become smaller. However, there are limits on how small the flying height can be. Recently, a magnetic disk apparatus which contacts the recording surface has been developed.

In the magnetic disk apparatus with contact recording heads, the head always contacts the disk and slides on the disk. Therefore, it often happens that both surfaces of the head and the disk are worn. In order to decrease wear of the head and the disk, the load force of the head to the disk should be decreased as much as possible (as disclosed in Japanese Patent Disclosure (Kokai) No.7-307069). However, the wear of the head and the disk is not entirely avoided. As for the wear of the head, structure not have influencing magnetic function is prepared in the magnetic disk even if the head is worn to some extent. Under this structure, some wear is permissible (as disclosed in "H. Hamilton, IEEE Trans. on Magn., Vol.27, No.6-pp 4921–4926 (1991)).

On the other hand, as for the wear of the disk, the disk is fatally wounded if the magnetic layer of the disk is greatly worn. Therefore, the wear of the disk should be avoided to the utmost. However, if the head is frequently located on a specific area (e.g. the area to store information to control file) wear progresses move quickly on the specified area.

As mentioned above, in a read-write apparatus which contacts the recording, if the head slides on the specified area of the disk at excessive times, the wear progresses on that specific area.

SUMMARY OF THE INVENTION

It is an object of the present invention to provide read-write apparatus and methods which avoid the head slide on a specific area of the disk concentratedly to prevent the progress of the wear on the specified area.

According to the present invention, there is provided a read-write apparatus including a disk and a read-write head for reading and writing information on the disk by contacting the recording media, comprising; calculation means for calculating a slide count of the read-write head while reading and writing on the recording media.

Further in accordance with the present invention, there is provided an information processing apparatus to which a read-write apparatus is conectable, wherein the read-write apparatus includes a disk and a read-write head for reading and writing information on the recording media by contacting the disk, comprising; calculation means for calculating a slide count of the read-write head while reading and writing on the recording media, and memory means for storing the slide count calculated by said calculation means.

Further in accordance with the present invention, there is provided a method for calculating a slide count of a read-write head on a disk, comprising the steps of: accessing information on the recording media by the read-write head contacting the recording media, and calculating the slide count of the read-write head at the accessing step.

Further in accordance with the present invention, there is provided a computer readable memory containing computer-readable instructions to calculate a slide count of a read-write head on a recording media, the recording media being rotationally set, comprising: instruction means for causing a computer to access information on the recording media by the read-write head's contacting to the recording media, and instruction means for causing a computer to calculate the slide count of the read-write head while accessing the recording media.

DETAILED DESCRIPTION OF THE PREFERRED EMBODIMENTS

Embodiments of the present invention are described below with reference to the drawings.

Figure 1:
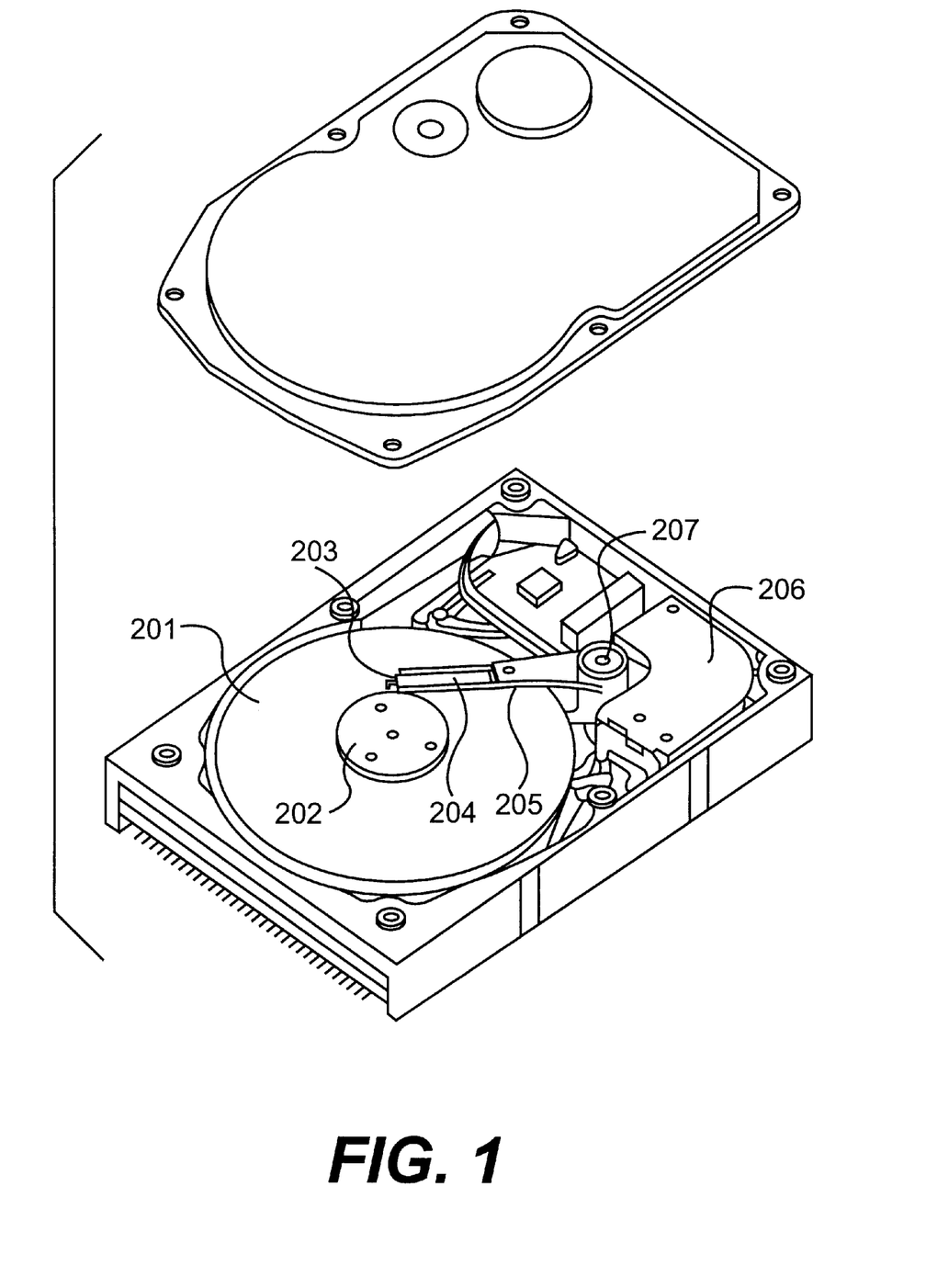
FIG. 1 is a schematic diagram of a magnetic disk apparatus as an example of the read-write apparatus in accordance with a preferred embodiment.

A structure of a magnetic disk drive in which the apparatus and methods of the present invention are used will be described with reference to FIG. 1. A disk 201 is set on a spindle 202, and rotated at a constant rotational speed by the spindle 202. A slider 203 carrying a magnetic pole is mounted on a tip end of a suspension 204, and accesses the disk 201 in order to read and write information. The suspension 204 is connected to an end of an arm 205 which has a bobbin portion holding a driving coil (not shown). The other end of the arm 205 consists a voice coil motor 206, which is a type of linear motor. The arm 205 is held by ball bearings (not shown) provided in two locations, i.e. above and below a fixing axis 207, and the arm 205 can be freely rotated and/or oscillated by the voice coil motor 206. The voice coil motor 206 has a driving coil wound around the bobbin portion of the arm 205, and a magnetic circuit including of a permanent magnet (not shown) arranged to sandwich the coil and to oppose each other, and an opposing yoke (not shown).

The present invention is not limited to being applied to a magnetic disk drive in which a rotary actuator is used. It is possible to apply it to other types of magnetic disk drives, for example, a magnetic disk drive in which a linear actuator is used.

Figure 2:
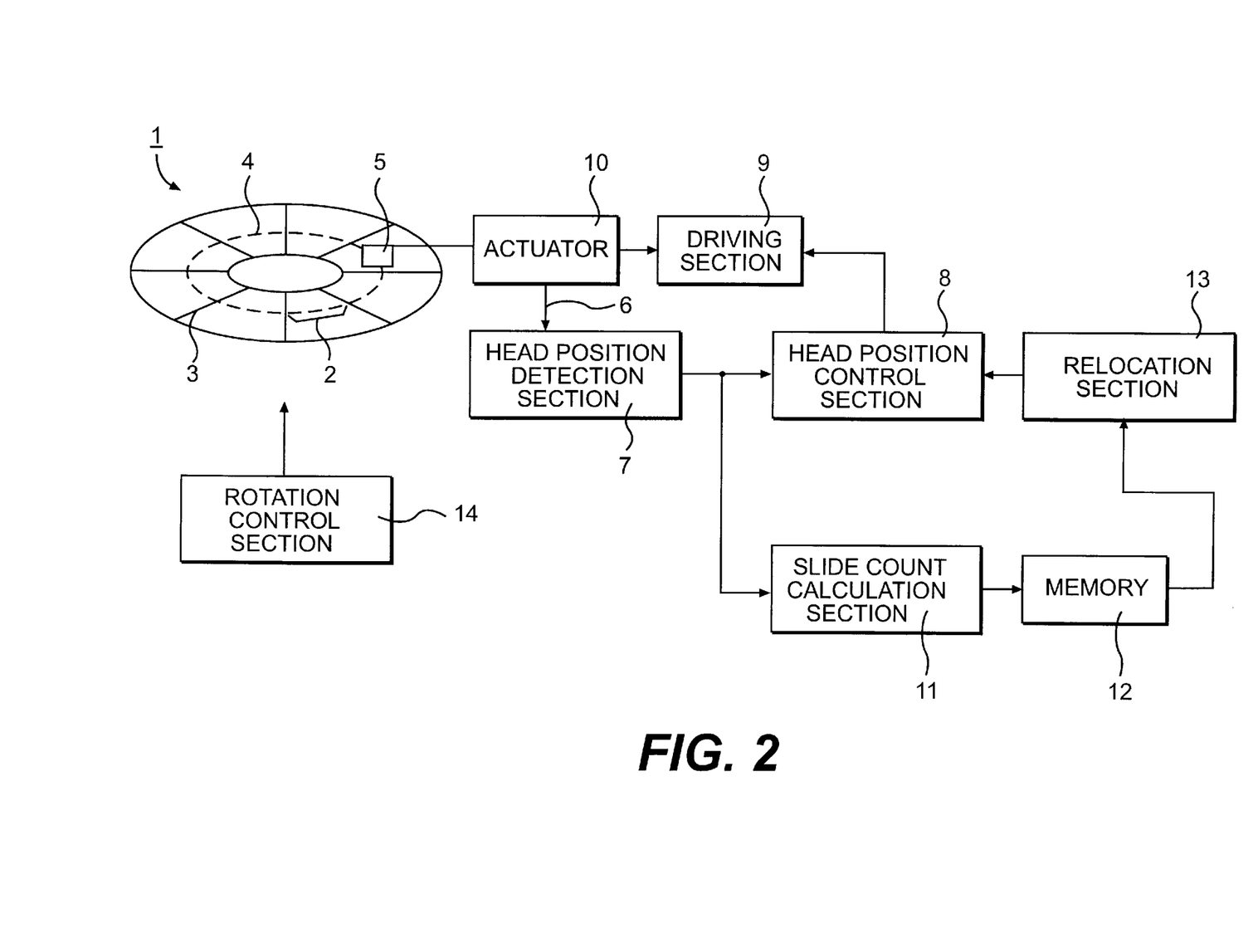
FIG. 2 is a block diagram of the read-write apparatus according to the present invention.

FIG. 2 is a block diagram of the read-write apparatus according to a first embodiment of the present invention. In the read-write apparatus of FIG. 2, information is read and written on disk 1 by contacting the head 5 to the disk 1. In this case, one area of disk 1 stores a control information file and the head 5 slides more frequently on this area in comparison with other areas. Therefore, the wear progresses faster on this area. In order to assist in preventing this wear, a slide count of the head 5 on each area on the disk 1 is accumulated. In accordance with the slide count, a warning is output to a user or repeat slide of the head on the specified area is avoided.

However, in the prior art, it is usual that information is read and written on the disk by a flying head 5 without contacting the disk 1. Therefore, a slide count of the head 5 on the disk 2 is not accumulated.

In the present invention, a slide count for each area of the disk 1 is accumulated by monitoring servo information recorded on the disk 1. The slide count is memorized for specified units of area of disk 1.

Figure 3:
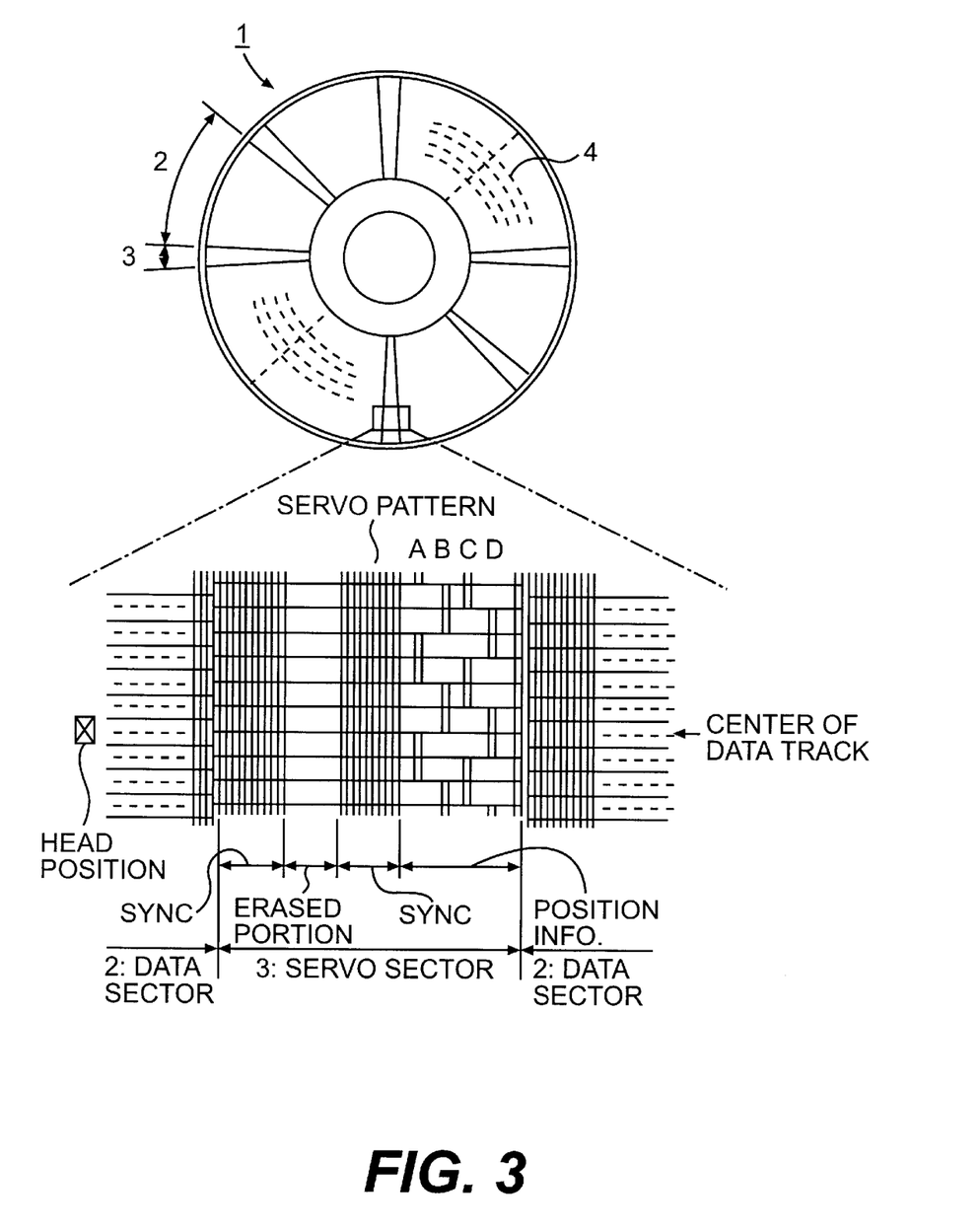
FIG. 3 is a schematic diagram of data structure on the disk.

FIG. 3 is a diagram of a preferred embodiment for disk 1. As shown in FIG. 3, the structure comprises a plurality of concentric data tracks 4 and spoke-like servo sectors 3 located at intervals of predetermined angles on the disk 1. Servo sector 3 stores servo information for each data track. The data track 4 is divided into a plurality of data sectors 2 by the servo sector 3. Servo information of the servo sector 3 is comprised of a servo pattern, position information, synchronization signal and erased portion. The position information represents addresses of corresponding data tracks. Accordingly, the address of the data track corresponding to head position is recognized by the position information of the data track in the servo pattern.

As shown in FIG. 2, head 5 reads servo information 6 from servo sector 3 at predetermined intervals while disk 1 is rotating. The servo information 6 is sent to a head position detection section 7. The head position detection section 7 detects the track position (address) of the head on the disk 1 according to the servo information 6. A head position control section 8 executes seek control and track following control. Seek control moves head 5 to specific areas of the data track 4 to access information on the disk 1. Track following control accuates the location of the head 5 on the data track 4. An actuator 10 is activated through a driving section 9 according to output signal from the head position control section 8 and the head is accurately located on the data track 4. Such detection of track position of the head 5 from the servo sector 3 is executed while rotating the disk 1. Therefore, a slide count calculation section 11 accumulates the slide count representing the number of slides that head 5 slides on one data track 4. The count is based on the track position information from the servo sector 3. The slide count is accumulated according to units of the data sector 2. The detailed method of count accumulation is explained with reference to FIG. 4.

Figure 4:
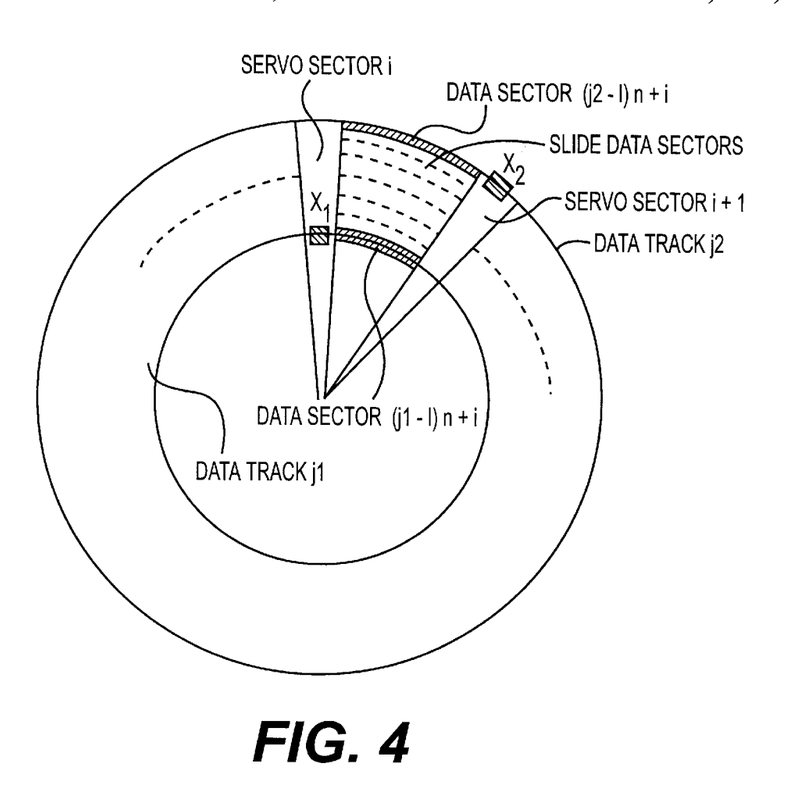
FIG. 4 is a schematic diagram of relation among servo sector, data sector and slide area on the disk.

FIG. 4 is a schematic diagram showing the relation among the servo sector, the data sector and the slide area on the disk 1. Assume that n pieces of the servo sectors 3 are located from position 1 to n along the rotation direction, and m pieces of data track 4 are located from positions 1 to m toward concentric circles (from inner circle to outher circle) on the disk 1. The number of data sectors 2 between servo sector i and servo sector i+1 along data track j is (j−1)×n+i. Track position X of the head 5 is j+0.0 if head 5 is located on the center of data track J. Then track position X of the head 5 is j+0.5 if head 5 is located between data track j and data track J+1.

As shown in FIG. 4, assume that a track position $X_1$ of the head 5 is detected by servo sector i as "$j_1-0.5 \leq X_1 < j_1+0.5$" on data track $j_1$ and the next track position $X_2$ of the head 5 is detected by servo sector i+1 as "$j_2-0.5 \leq X_2 < j_2+0.5$" on data track $j_2$. In this case, the slide count calculation section 11 determines that head 5 on servo sector i is located on data track $j_1$ and the head 5 on servo sector i+1 is located on data track $j_2$. In addition, the slide count calculation section 11 determines that the head 5 slides data sector $(j_1-1)n+i, \ldots,$ data sector $(j_2-1)n+i$ from data track $j_1$ to data track $j_2$ while the head position moves from the track position $X_1$ to the next track position $X_2$. A memory 12 includes a plurality of areas which store the slide count by data sector units. As mentioned above, (m×n) pieces data sectors 2 are included in disk 1. Therefore, for the area corresponding to data sector 2 to be slided by the head 5, the slide count is accumulated.

Next, an example of the slide count calculation section 11 is explained. Assume that the number "n" of the servo sectors is "60", number "m" of the data track is "1000", the track position "$X_1$" of the head 5 on 3rd servo sector is "3.2", the track position "$X_2$" of the head 5 on 4th servo sector is "6.8". In this case, the slide count calculation section 11 decides that the head 5 on 3rd servo sector is located on 3rd data track and the head 5 on 4th servo sector is located on 7th data track. In addition to this, the slide count calculation section 11 decides that data sector #123 on the 3rd data track, data sector #183 on the 4th data track, data sector #243 on the 5th data track, data sector #303 on the 6th data track, data sector #363 on the 7th data track are slided over while the head slides from the track position $X_1$ (=3.2) to the track position $X_2$ (=6.8). In memory 12, the slide count is increased for the five areas coresponding to five data sectors (123, 183, 243, 303, and 363) by "1".

Figure 5:
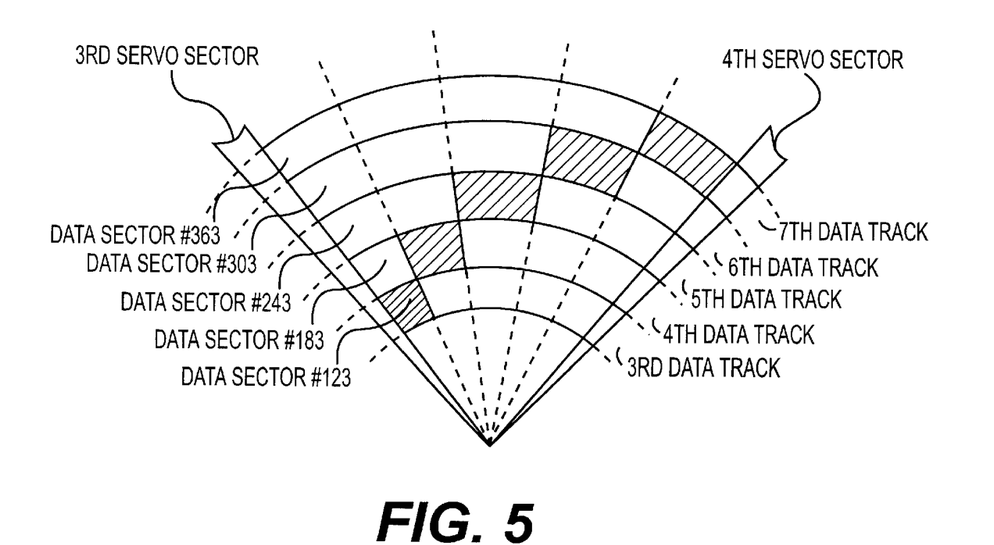
FIG. 5 is a schematic diagram of one example of the data sectors corresponding to a plurality of data tracks.

FIG. 5 is a diagram of one example of the data sectors corresponding to a plurality of the data tracks. In case that K($\geq 2$) pieces of the data sectors are slid over between servo sector i and servo sector i+1, all areas of each data sector are not slided. In the above example, five data sectors are respectively divided by five areas from 3rd servo sector to 4th servo sector as shown in FIG. 5. In data sector #123, first oblique line area near servo sector #3 is slid over. In data sector #183, second oblique line area is slid over. In data sector #243, third oblique line area is slid over. In data sector #303, fourth oblique line area is slid over. In data sector #363, fifth oblique line area near servo sector #4 is slid over. Therefore, each data sector is respectively divided as fine units and the slide count is accumulated by unit of the fine unit of the data sector. The number of the fine units of each data sector is set as the maximum of number of data tracks 4 which the head 1 slides over at a time.

Next, a second embodiment of the slide count calculation section 11 is explained. In this embodiment, a weight is multiplied by the slide count according to the slide situation of the head. In short, a condition of the slide count for each area on the disk is correctly evaluated. As a method of weight-multiplication, it is considered that a large weight is set in the case of a fast slide speed, a small weight is set in case of the head passing a particular part of the data sector, and a large weight is set in case of the data sector whose signal quality is poor.

Figure 6:
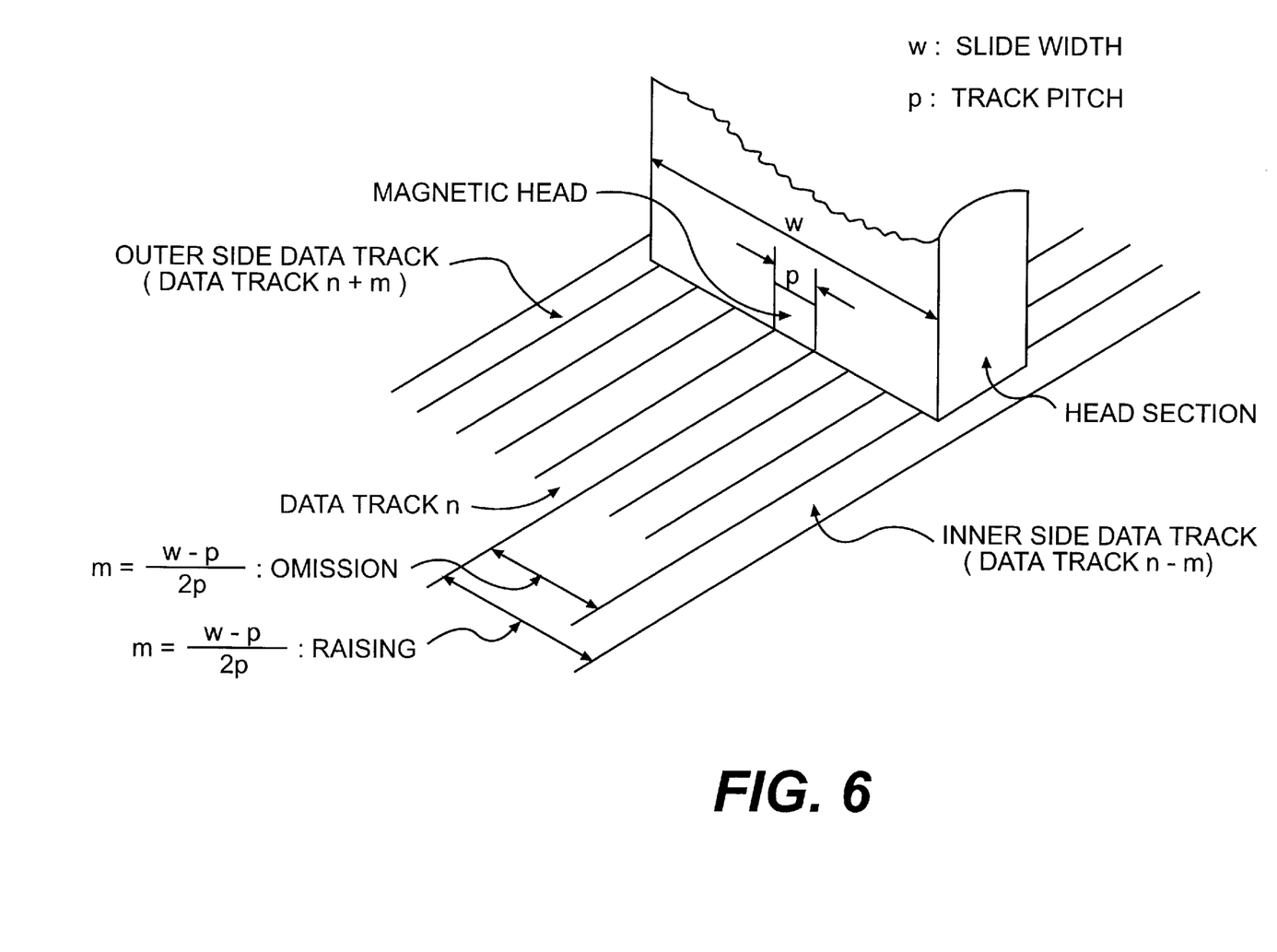
FIG. 6 is a schematic diagram of relation between track pitch and slide width of the head used for the read-write apparatus of the contact recording.

Next, the slide count calculation section 11 according to another modification of the first embodiment is explained. FIG. 6 is a schematic diagram of the relation between track pitch and slide width of the head used for the read-write apparatus of the contact recording. As shown in FIG. 6, in the head of the contact recording, a slide width w for a head section to contact the data tracks is larger than a track pitch p of one data track-width (a magnetic head-width). In short, in addition to one data track to be accessed, the head slides over other data tracks. Therefore, as for the other data tracks, a number of slides is counted to detect areas of the disk to be actually slided by the head section. In this case, in case data track n is detected to be located by the magnetic head according to the servo information, all data tracks from data track n−m to data track n+m are decided to be actually slid.

$$m = \frac{W-P}{2P}: \text{raised to the next highest integral number} \quad (i)$$

If the head section slides over a part of an inner side data track or an outer side data track, all parts of the inner side data track or the outer side data track is determined to be slid over and the number of slide is counted for the inner side data track or the outer side data track.

$$m = \frac{W-P}{2P}: \text{rounded down to the next integral number} \quad (ii)$$

If the head section slides over half of the inner side data track or the outer side data track, the number of slide is counted for the inner side data track or the outer side data track. If the head section slides over less than half part of the inner side data track or the outer side data track, the number of slide is not counted for the inner side data track or the outer side data track.

$$m = \frac{W-P}{2P}: \text{integral number not counted} \quad (iii)$$

Even if the head section slides over a part of the inner side data track or the outer side data track, the number of slide is not counted for the inner side data track or the outer side data track.

In case (iii), when the number of slide is counted for the inner side data track or the outer side data track, 1/(2P) of surplus of (W−P)/(2P) may be used as weight for multiplication.

Figure 7:
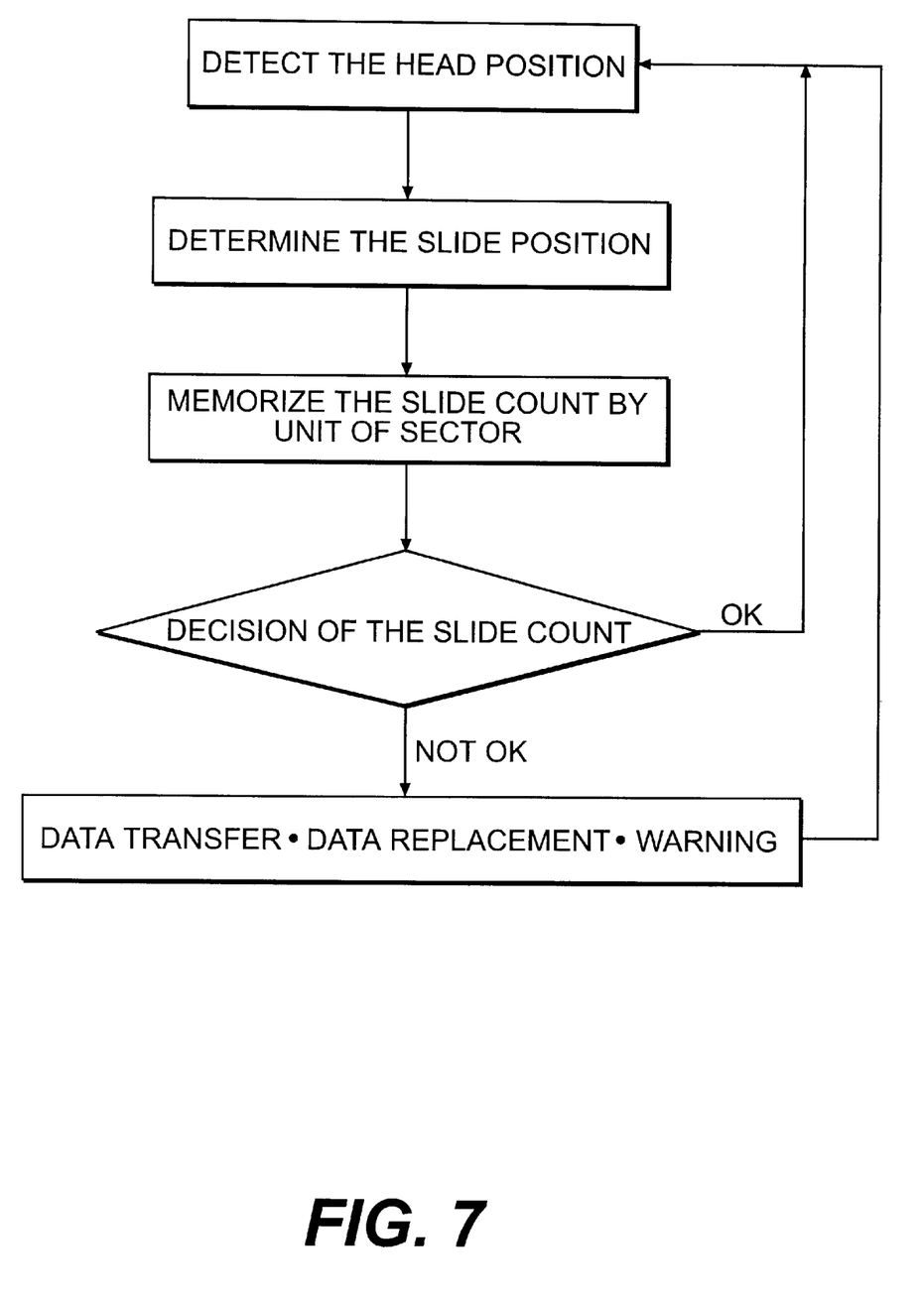
FIG. 7 is a flow chart of processing of the read-write method according to the present inrention.
Figure 8:
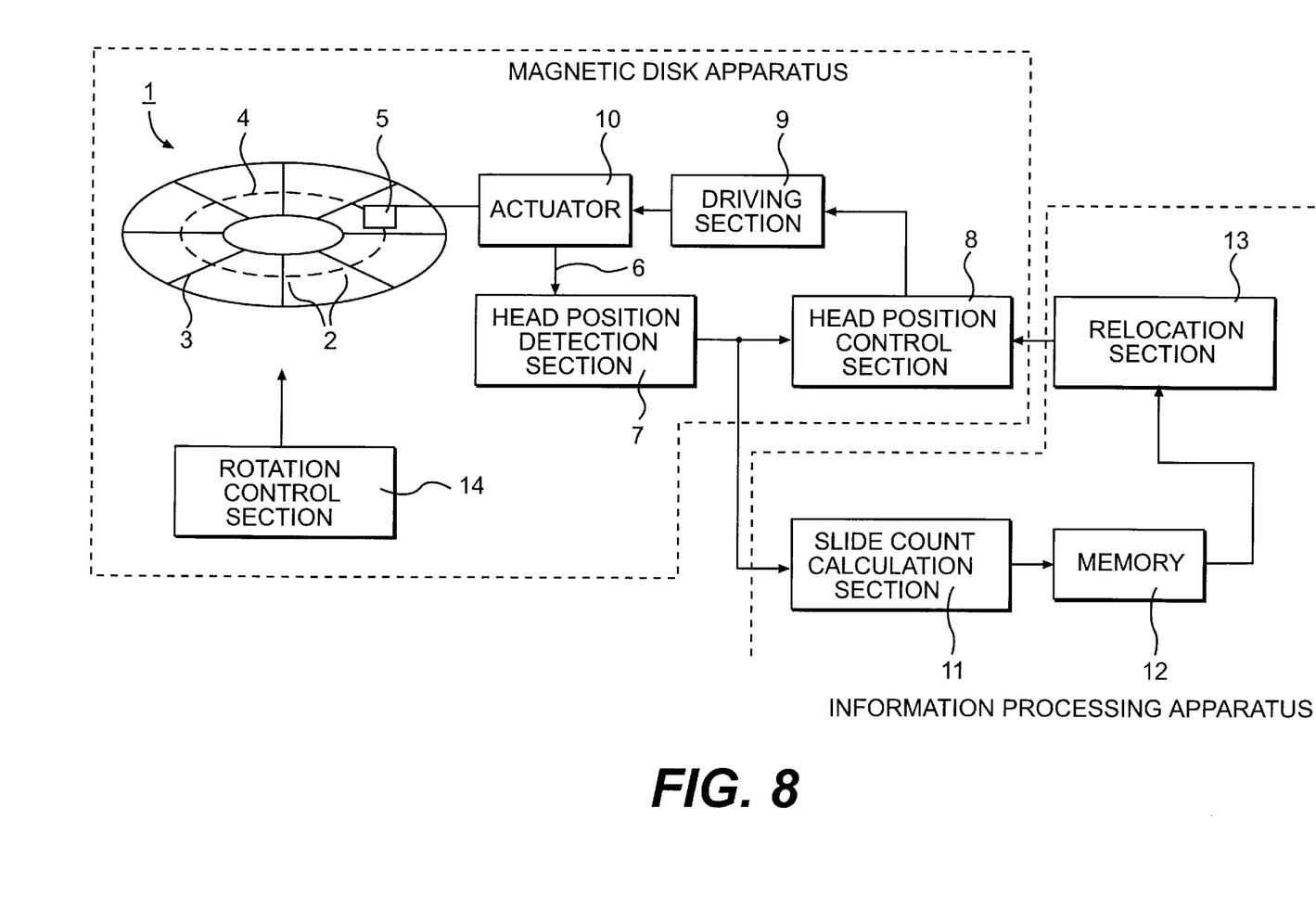
FIG. 8 is a block diagram of the read-write apparatus connected to an information prcessing apparatus according to the present invention.

Next, the read-write apparatus according to a second embodiment of the present invention is explained. The architecture of FIG. 2 may also be used as the read-write apparatus according to the second embodiment. FIG. 7 is a flow chart of processing of the read-write apparatus according to the second embodiment. In the second embodiment, a relocation section 13 in FIG. 2 is added to the first embodiment described above. Relocation section 13 relocates the information by units of area on the disk 1 according to the slide count stored in the memory 12. Determination of relocation is made after a predetermined period of time has elapsed. For example, recorded information in one area whose slide count is the largest is transferred to an area whose slide count is the smallest in the disk 1. In this case, if no information is recorded in the other area, the recorded information in the one area whose slide count is the largest is simply transferred. In case information is already recorded in the other area, the information recorded in the one area and the other area are exchanged. Of course, index data (not shown in the Figs.) representing an area address to record the information is updated according to the transfer. In this way, the slide count of each area on the disk is normalized. FIG. 8 is a block diagram of the magnetic disk apparatus of the second embodiment connected to an information processing apparatus. As shown in FIG. 8, in the information processing apparatus, the slide counts in memory 12 is output to the relocation section 13. The relocation section 13 in the information processing apparatus executes relocation of the information of each area on the disk 1 according to the slide count.

In another embodiment, one data file on the disk consists of plural data blocks each of which includes an identifier. The data file is relocated so that the slide count is not above predetermined value per unit of the data block. For example, one data block may correspond to one data sector. In this case, the data block is relocated according to the slide count of each data sector. However, in recent data formats, one data block corresponds to plural data sectors by using ZBR (Zone Bit Recording). In this case, the one data block is relocated according to one data sector whose slide count is the largest among the plural data sectors.

Furthermore, the information may be relocated in order to collect in one area plural data tracks whose slide count is respectively large. In this case, a number of data tracks to which the head crosses decreases. In this way, a number of data tracks to be slid decreases. Otherwise, a plurality of empty areas to which the head does not access are created on the disk. In this way, concentrated slide on a specified data track on the disk is reduced.

In relocation processing of the second embodiment, as shown in FIG. 2, the relocation section 13 outputs a relocation signal (transfer source area address and transfer destination area address) to the head position control section 8 according to the slide count in the memory 12. The head position control section 8 drives the actuator 10 through the driving section 9. Therefore, the head is moved to the area corresponding to the transfer source address and the transfer destination address by driving of the actuator 10.

As shown in FIG. 8, the functions of the slide count calculation section 11, the memory 12, the relocation section 13 are included in the information processing apparatus, the information processing apparatus outputs the relocation signal to the head position control section 8 in the magnetic disk apparatus.

Next, the read-write apparatus according to modification of the second embodiment is explained. In the modification, in addition to the slide count, the quality of the read-out signal (resolution, signal-amplitude), error-rate of the read-out signal and servo signal, and the condition of spindle motor (rise time) are monitored by the information processing apparatus to which the magnetic disk apparatus is connected in FIG. 8. Inside the information processing apparatus, reliability of the disk is decided. For example, in case the maximum of the slide count for each area on the disk is above a predetermined value and close to the span of life, a warning signal is output through the information processing apparatus. In short, backup of information on the disk and update of the magnetic disk apparatus is requested for the user. The warning signal may be a buzzer or display on the monitor. Furthermore, at same time of the warning signal, a number of rotation of the disk is decreased to, for instance, ½ and recording frequency is changed to half of original frequency by a rotation control section 14 in FIG. 8. In the magnetic disk apparatus of contact recording, if the number of rotation of the disk decreases, slide speed of the head and the disk also decreases. In short, progress of wear for the head and the disk is decreased and the span of life of the disk is prolonged. Therefore, even if the warning signal is outputted, the backup processing is executed with enough time because the span of life is extended. In this case, if relative speed between the head and the disk decreases, amplitude of the read-out signal of the head also decreases. In order to avoid this problem, a special MR head in which the amplitude of read-out signal does not depend on the relative speed can be used.

Next, the read-write apparatus according to another modification of the second embodiment is explained. In general, if dust or other defect exists on an area of the disk, the read-out signal from the area by the head includes an error. Therefore, in another modification of the second embodiment, the dust or defect on the disk is detected using the error of the read-out signal and recovery processing is executed. In the magnetic disk apparatus of contact recording, it is desired that surface of the disk is flat to the utmost to prevent a headcrash. However, a production condition or use situation may create a defect on the surface of the disk, or the dust may be attached to the surface of the disk. In such instances, it is impossible to read and write information by normally contacting the head to the disk. Therefore, in addition to accumulating the slide count on the disk, the read signal of each area on the disk is monitored. In case the read signal of one area includes error several times, the one area of the disk is decided to include the defect and recovery processing is executed. Because the wear progresses on the head and the disk if the head repeatedlly slides over one area including the defect (e.g., physical projection or hole) on the disk. Therefore, in another modification of the second embodiment, in case the read signal of one area includes error several times, recorded information on the data track including the defect by unit of one data sector is saved to another data track. In addition to this processing, the head is prohibited from being located on the data track which includes the error in order to prevent damage of the head and the disk. As shown in FIG. 6, in case the slide width W of the head section is larger than the track pitch P and data track n includes the defect, recorded information from data track n−m to data track n+m by unit of one data sector is saved to other data track (m=(W−P)/(2P): raised to the next integral number). In addition to this processing, the head is prohibited from being located on the data track from data track n−m to data track n+m.

A memory can be used to store instructions for performing the process described above. Such a memory can be, for example, a CD-ROM, floppy disk, hard disk, magnetic tape, semiconductor memory.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A read-write recording apparatus, comprising:
   a rotationally set recording media;
   a read-write head for reading and writing information on the recording media by contacting the recording media;
   calculation means for counting a number of slides of the read-write head over a predetermined area on the recording media by monitoring servo information previously recorded on the recording media while the recording media is rotating;
   memory means for storing the number of slides counted by said calculation means over the predetermined area; and
   relocation means for relocating information recorded in the predetermined area of the recording media in accordance with the number of slides over the predetermined area stored in said memory means.

2. The read-write recording apparatus according to claim 1,
   wherein said calculation means multiplies the number of slides by a weight in accordance with a slide condition over the predetermined area.

3. The read-write recording apparatus according to claim 1,
   wherein said relocation means transfers information recorded in one predetermined area having a number of slides larger than a threshold to another predetermined area having a number of slides smaller than the threshold.

4. The read-write recording apparatus according to claim 1,
   wherein said relocation means relocates information recorded in one predetermined area having a number of slides larger than a threshold to another predetermined area having a number of slides smaller than the threshold.

5. The read-write recording apparatus according to claim 1,
   wherein said relocation means relocates information recorded in a plurality of the predetermined areas respectively having a number of slides larger than a threshold to collect in one area of the recording media.

6. The read-write recording apparatus according to claim 1,
   further comprising control means for changing a rotational speed number of the recording media in accordance with the number of slides.

7. The read-write recording apparatus according to claim 6,
   wherein said control means detects a non-recoverable defect area based on the number of slides and quality of signal read by the read-write head, and prohibits location of the read-write head on the area.

8. An information processing apparatus to which a read-write recording apparatus is connectable, wherein the read-write apparatus includes a rotationally set recording media and a read-write head which contacts the recording media, said information processing apparatus comprising:
   calculation means for counting a number of slides of the read-write head over a predetermined area on the recording media by monitoring servo information previously recorded on the recording media while the recording media is rotating;
   memory means for storing the number of slides counted by said calculation means over the predetermined area; and
   relocation means for relocating information recorded in the predetermined area of the recording media in accordance with the number of slides over the predetermined area stored in said memory means.

9. The information processing apparatus according to claim 8, wherein said calculation means multiplies the number of slides by a weight in accordance with a slide condition over the predetermined area.

10. The information processing apparatus according to claim 8,
further comprising control means for transmitting a warning to a user in accordance with the number of slides.

11. The information processing apparatus according to claim 8,
wherein said relocation means transfers information recorded in one predetermined area having a number of slides larger than a threshold to another predetermined area having a number of slides smaller than the threshold.

12. The information processing apparatus according to claim 8,
wherein said relocation means relocates information recorded in one predetermined area having a number of slides larger than a threshold to another predetermined area having a number of slides smaller than the threshold.

13. The information processing apparatus according to claim 8,
wherein said relocation means relocates information recorded in a plurality of the predetermined areas respectively having a number of slides larger than a threshold to collect in one area of the recording media.

14. The information processing apparatus according to claim 8,
wherein said control means changes a rotational speed of the recording media in accordance with the number of slides.

15. The information processing apparatus according to claim 8,
wherein said control means detects a non-recoverable defect area based on the number of slides and quality of signal read by the read-write head, and prohibits location of the read-write head on the area.

16. A method for counting a number of slides of a read-write head on a rotationally set recording media, comprising:

accessing information on the recording media using the read-write head contacting the recording media while the recording media is rotating;

monitoring servo information previously recorded over a predetermined area on the recording media at the accessing step;

counting the number of slides of the read-write head over the predetermined area on the recording media in accordance with the servo information monitored at the monitoring step;

storing the number of slides over the predetermined area counted at the counting step; and relocating information recorded in the predetermined area of the recording media in accordance with the number of slides over the predetermined area stored at the storing step.

17. A computer readable memory containing computer-readable instructions to count a number of slides of a read-write head on a rotationally set recording media, comprising:

instruction means for causing a computer to access information on the recording media using the read-write head contacting the recording media while the recording media is rotating;

instruction means for causing a computer to monitor servo information previously recorded over a predetermined area on the recording media while accessing;

instruction means for causing a computer to count the number of slides of the read-write head over the predetermined area on the recording media in accordance with the servo information monitored;

instruction means for causing a computer to store the number of slides over the predetermined area counted; and instruction means for causing a computer to relocate information recorded in the predetermined area of the recording media in accordance with the number of slides over the predetermined area stored.

* * * * *